US010337405B2

(12) United States Patent
Steen et al.

(10) Patent No.: US 10,337,405 B2
(45) Date of Patent: Jul. 2, 2019

(54) METHOD AND SYSTEM FOR BOWED ROTOR START MITIGATION USING ROTOR COOLING

(71) Applicant: General Electric Company, Schenectady, NY (US)

(72) Inventors: Tod Robert Steen, West Chester, OH (US); Amid Ansari, Mason, OH (US); Anthony Paul Greenwood, Kings Mills, OH (US)

(73) Assignee: General Electric Company, Schenectady, NY (US)

( * ) Notice: Subject to any disclaimer, the term of this patent is extended or adjusted under 35 U.S.C. 154(b) by 453 days.

(21) Appl. No.: 15/156,708

(22) Filed: May 17, 2016

(65) Prior Publication Data

US 2017/0335768 A1 Nov. 23, 2017

(51) Int. Cl.
| | | |
|---|---|---|
| *F02C 3/04* | (2006.01) | |
| *F02C 7/12* | (2006.01) | |
| *F02C 9/00* | (2006.01) | |
| *F01D 9/06* | (2006.01) | |
| *F01D 25/12* | (2006.01) | |

(Continued)

(52) U.S. Cl.
CPC ............... *F02C 7/12* (2013.01); *F01D 9/065* (2013.01); *F01D 25/12* (2013.01); *F02C 3/04* (2013.01); *F02C 7/18* (2013.01); *F02C 9/00* (2013.01); *B64D 27/16* (2013.01); *F05D 2220/323* (2013.01); *F05D 2240/242* (2013.01); *F05D 2260/201* (2013.01); *Y02T 50/676* (2013.01)

(58) Field of Classification Search
CPC .. F01D 9/065; F01D 25/12; F02C 3/04; F02C 7/12; F02C 9/00; F02C 7/18; B64D 27/16; F05D 2220/323; F05D 2240/242; F05D 2260/201; Y02T 50/676
See application file for complete search history.

(56) References Cited

U.S. PATENT DOCUMENTS

| | | |
|---|---|---|
| 4,291,531 A | 9/1981 | Campbell |
| 4,452,037 A | 6/1984 | Waddington et al. |

(Continued)

FOREIGN PATENT DOCUMENTS

| | | |
|---|---|---|
| EP | 0 141 770 A1 | 5/1985 |
| EP | 2 213 843 A2 | 8/2010 |

(Continued)

OTHER PUBLICATIONS

International Search Report and Written Opinion issued in connection with corresponding PCT Application No. PCT/US2017/024930 dated Jun. 14, 2017.

(Continued)

*Primary Examiner* — Igor Kershteyn
(74) *Attorney, Agent, or Firm* — Dority & Manning, P.A.

(57) ABSTRACT

An apparatus and method of cooling a rotatable member enclosed within a casing are provided. The gas compressor includes a rotor, a plurality of stages of compression extending along said rotor from an inlet stage configured to receive a flow of relatively low pressure gas to an outlet stage configured to discharge a flow of relatively high pressure gas, a casing at least partially surrounding said plurality of stages, and a conduit extending radially inwardly from said casing to an area proximate said rotor.

17 Claims, 3 Drawing Sheets

(51) Int. Cl.
 *F02C 7/18* (2006.01)
 *B64D 27/16* (2006.01)

(56) References Cited

U.S. PATENT DOCUMENTS

| | | | | |
|---|---|---|---|---|
| 4,513,567 A | * | 4/1985 | Deveau | F01D 11/08 |
| | | | | 415/178 |
| 4,576,547 A | * | 3/1986 | Weiner | F01D 11/24 |
| | | | | 415/116 |
| 4,653,267 A | | 3/1987 | Brodell et al. | |
| 4,893,984 A | * | 1/1990 | Davison | F01D 11/24 |
| | | | | 415/116 |
| 5,134,844 A | * | 8/1992 | Lee | F01D 5/08 |
| | | | | 415/116 |
| 5,292,227 A | | 3/1994 | Czachor et al. | |
| 5,385,012 A | | 1/1995 | Rowe | |
| 5,439,353 A | | 8/1995 | Cook et al. | |
| 5,525,032 A | * | 6/1996 | Kreis | F01D 5/085 |
| | | | | 415/1 |
| 5,965,240 A | | 10/1999 | Blackburn et al. | |
| 6,132,857 A | | 10/2000 | Campenois et al. | |
| 6,141,951 A | | 11/2000 | Krukoski et al. | |
| 6,498,978 B2 | | 12/2002 | Leamy et al. | |
| 6,575,699 B1 | | 6/2003 | Jones | |
| 7,510,778 B2 | | 3/2009 | Bernard et al. | |
| 7,708,518 B2 | * | 5/2010 | Chehab | F01D 11/24 |
| | | | | 415/1 |
| 7,744,346 B2 | | 6/2010 | Schreiber et al. | |
| 7,766,610 B2 | | 8/2010 | Busekros et al. | |
| 7,780,410 B2 | | 8/2010 | Kray et al. | |
| 7,780,420 B1 | | 8/2010 | Matheny | |
| 7,805,839 B2 | | 10/2010 | Cammer | |
| 8,137,073 B2 | | 3/2012 | Guisti et al. | |
| 8,177,503 B2 | * | 5/2012 | Bintz | F01D 5/087 |
| | | | | 415/208.1 |
| 8,210,801 B2 | * | 7/2012 | Ballard, Jr. | F01D 11/24 |
| | | | | 415/115 |
| 8,240,975 B1 | | 8/2012 | Ryznic | |
| 8,296,037 B2 | * | 10/2012 | Plunkett | F01D 11/20 |
| | | | | 60/782 |
| 8,776,530 B2 | | 7/2014 | Shirooni et al. | |
| 8,820,046 B2 | | 9/2014 | Ross et al. | |
| 9,091,173 B2 | | 7/2015 | Mosley et al. | |
| 9,121,309 B2 | | 9/2015 | Geiger | |
| 2002/0173897 A1 | | 11/2002 | Leamy et al. | |
| 2007/0031249 A1 | | 2/2007 | Jones | |
| 2008/0253922 A1 | | 10/2008 | Trimmer et al. | |
| 2009/0025365 A1 | | 1/2009 | Schilling et al. | |
| 2009/0301053 A1 | | 12/2009 | Geiger | |
| 2010/0329863 A1 | | 12/2010 | Kray et al. | |
| 2011/0027096 A1 | | 2/2011 | Northfield | |
| 2011/0049297 A1 | | 3/2011 | Jevons et al. | |
| 2011/0182741 A1 | | 7/2011 | Alexander | |
| 2011/0211967 A1 | | 9/2011 | Deal et al. | |
| 2011/0229334 A1 | | 9/2011 | Alexander | |
| 2011/0232294 A1 | | 9/2011 | Ross et al. | |
| 2012/0003100 A1 | | 1/2012 | James et al. | |
| 2012/0301292 A1 | | 11/2012 | Deal et al. | |
| 2012/0316748 A1 | | 12/2012 | Jegu et al. | |
| 2013/0034451 A1 | * | 2/2013 | Taniguchi | F01D 5/085 |
| | | | | 416/90 R |
| 2013/0091850 A1 | | 4/2013 | Francisco | |
| 2014/0236451 A1 | | 8/2014 | Gerez et al. | |
| 2014/0373553 A1 | | 12/2014 | Zaccaria et al. | |
| 2015/0044022 A1 | | 2/2015 | Bagni et al. | |
| 2015/0047359 A1 | | 2/2015 | Maguire et al. | |
| 2015/0252729 A1 | | 9/2015 | Niggemeier et al. | |

FOREIGN PATENT DOCUMENTS

| | | |
|---|---|---|
| EP | 2 543 851 A1 | 1/2013 |
| JP | H08-210152 A | 8/1996 |

OTHER PUBLICATIONS

Diepolder, W., "Design Features and Procedures to Reduce the Phenomenon of HP—Rotor Bow on Jet Engines," Retrieved on Sep. 23, 2009 from website http://www.mtu.de/en/technologies/engineering_news/development/33949Diepolder-September.pdf (12 pgs).

U.S. Appl. No. 14/984,531, filed Dec. 30, 2015, entitled System and Method of Reducing Post-Shutdown Engine Temperatures.

* cited by examiner

METHOD AND SYSTEM FOR BOWED ROTOR START MITIGATION USING ROTOR COOLING

BACKGROUND

The present disclosure relates generally to turbine engines and, more specifically, to systems and methods of mitigating the formation of thermal rotor bow in turbofan engines.

Known turbofan engines experience several different phases of operation including, but not limited to, startup, warmup, steady-state, shutdown, and cool-down. Turbofan engines may cycle through the different phases of operation several times a day depending on the use of the aircraft in which the turbofan engines are attached. For example, a commercial passenger aircraft typically shuts down its engines in between flights for safety purposes as passengers disembark from the aircraft. As such, residual heat remains in the aircraft's engines, which can cause a phenomenon known as thermal rotor bow. Thermal rotor bow is generally defined by deformation in the rotating components of the turbofan engine, such as the rotating drive shafts. Deformation in the rotating components of the turbofan engine can result in performance deterioration due to rubs and/or contact-related damage between the rotating and stationary components of the turbofan engine during engine startup, thereby reducing the service life of the turbofan engine.

Thermal rotor bow is especially prominent at times after engine shutdown, and before the engine is allowed to fully cool. Moreover, many known turbofan engines are unable to naturally mitigate thermal rotor bow during startup as the design of modern commercial turbofans shifts towards having higher bypass ratios and greater length-to-diameter ratios. More specifically, increasing the length-to-diameter ratio of the turbofan engines facilitates reducing the resonant frequency of the rotating assembly to potentially below engine idle speed. In the presence of thermal rotor bow, this will produce a vibratory response during engine startup. Such a vibratory response can cause unwanted aircraft-level effects in addition to physical damage to engine components. One known method of mitigating thermal rotor bow is to motor the turbofan engine with a starter motor to lessen the severity of the rotor bow prior to fuel introduction and subsequent progression to idle. However, motoring the turbofan engine with the starter motor during startup can be a time-consuming and inconvenient process. Another known method of mitigating thermal rotor bow is to introduce a cooling fluid into one of the compressor bleed ports to displace heated air within the engine. However, cooling fluid introduced into the compressor bleed port often is not channeled to a proper location in the gas turbine engine to be able to facilitate mitigating thermal rotor bow.

BRIEF DESCRIPTION

In one aspect, a gas compressor includes a rotor, a plurality of stages of compression extending along the rotor from an inlet stage configured to receive a flow of relatively low pressure gas to an outlet stage configured to discharge a flow of relatively high pressure gas, a casing at least partially surrounding the plurality of stages, and a conduit extending radially inwardly from the casing to an area proximate the rotor.

In another aspect, a gas turbine engine includes a core engine including a multistage compressor including a plurality of stages of compression extending along a rotor of the multistage compressor from an inlet stage configured to receive a flow of relatively low pressure gas to an outlet stage configured to discharge a flow of relatively high pressure gas. The gas turbine engine also includes a casing at least partially surrounding the plurality of stages and a conduit extending radially inwardly from the casing to an area proximate the rotor.

In yet another aspect, a method of cooling a rotatable member enclosed within a casing wherein the rotatable member includes a rotor aligned along an axis of rotation includes forming an aperture through the casing, coupling a conduit to a radially inner surface of the casing aligned with the aperture and extending proximate to the rotor and coupling a fitting to an outer surface of the casing aligned with the aperture and the conduit.

DRAWINGS

These and other features, aspects, and advantages of the present disclosure will become better understood when the following detailed description is read with reference to the accompanying drawings in which like characters represent like parts throughout the drawings, wherein.

Figure 1:
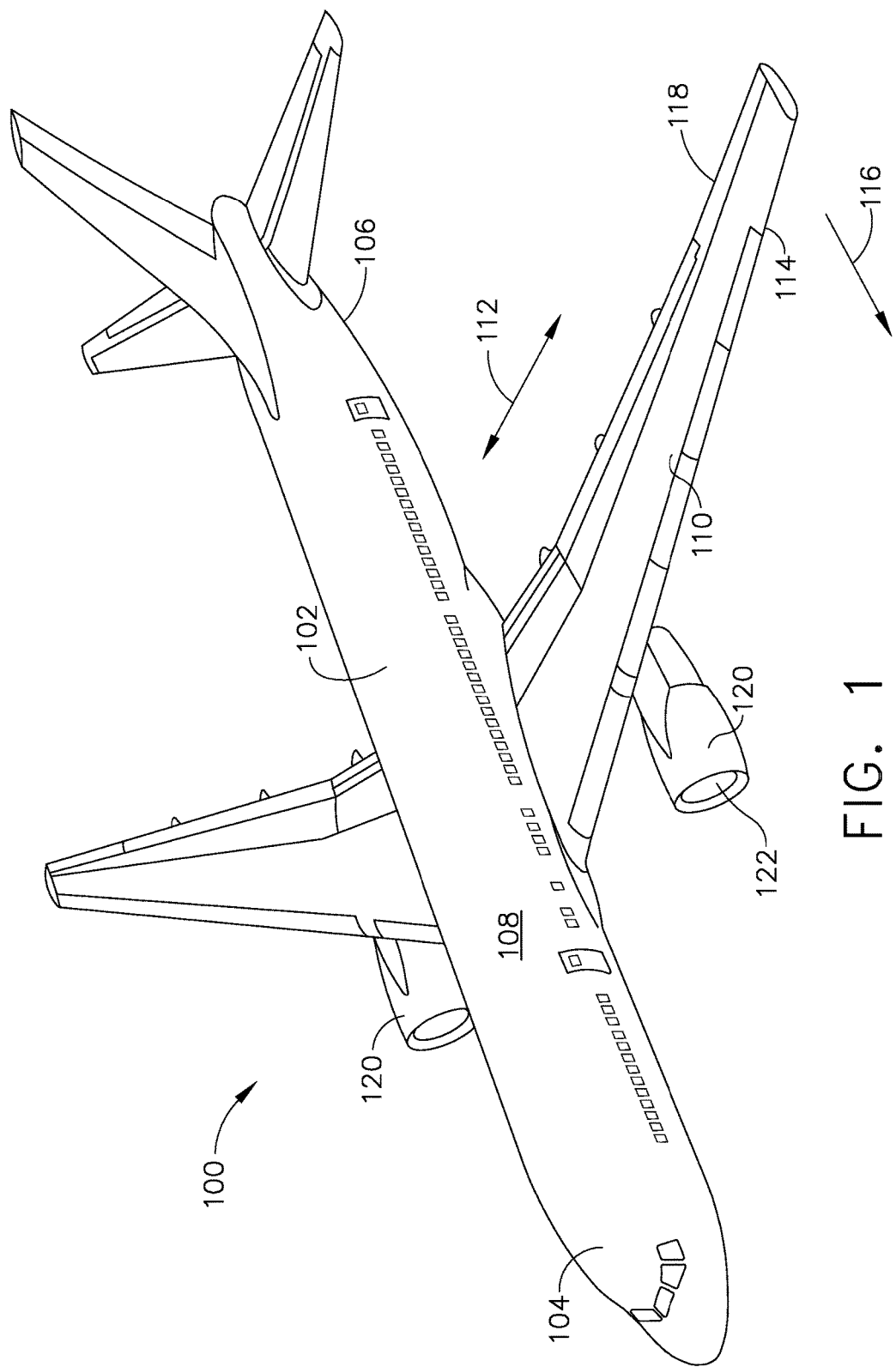
FIG. 1 is a perspective view of an aircraft.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. As used herein, "proximate" is intended to mean near, adjacent, contiguous, next to, close to, by, on, in contact with, and the like. "Proximate" refers to a positional reference where one component is able to affect another component that it is proximate to. For example, in the present disclose, a conduit is proximate a component when, for example, a fluid channeled through the conduit is able to affect the component by impingement or any method of cooling.

Embodiments of the present disclosure relate to systems and methods for use in mitigating the formation of thermal rotor bow in a rotatable machine, such as, but not limited to, a gas turbine engine. More specifically, the systems and methods described herein exhaust residual heat from within the turbofan engine after shutdown to reduce a thermal imbalance therein, thereby inhibiting the formation of thermal rotor bow. The residual heat is exhausted from within the turbofan engine by introducing a flow of cooling fluid to an area of the turbofan engine predetermined to be an area of concern for the formation of thermal rotor bow such that the gas turbine engine is allowed to cool in a faster and more efficient manner. The flow of cooling fluid also reduces a temperature difference between the top portion of the stationary rotor and the bottom portion of the stationary rotor. As such, the systems and methods described herein provide a post-flight rotor bow mitigation procedure that at least partially prevents thermal rotor bow from forming. Moreover, while described in the context of a turbofan engine, it should be understood that the systems and methods described herein are also applicable to geared turbofan (GTF) engines, turboprop engines, turbojet engines, and any other engine or rotatable machine where thermal rotor bow needs to be mitigated.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member 122 or fan to generate thrust. In various embodiments, engine 120 may be embodied in a gas turbine engine in a turbo prop or turbo fan configuration and may also be embodied in an electric motor having an open propeller or fan configuration. Engine 120 may also be configured as a gas turbine engine/electric motor hybrid. Engine 120 is coupled to at least one of wing 110 and fuselage 102, for example, in a pusher configuration proximate tail 106.

Figure 2:
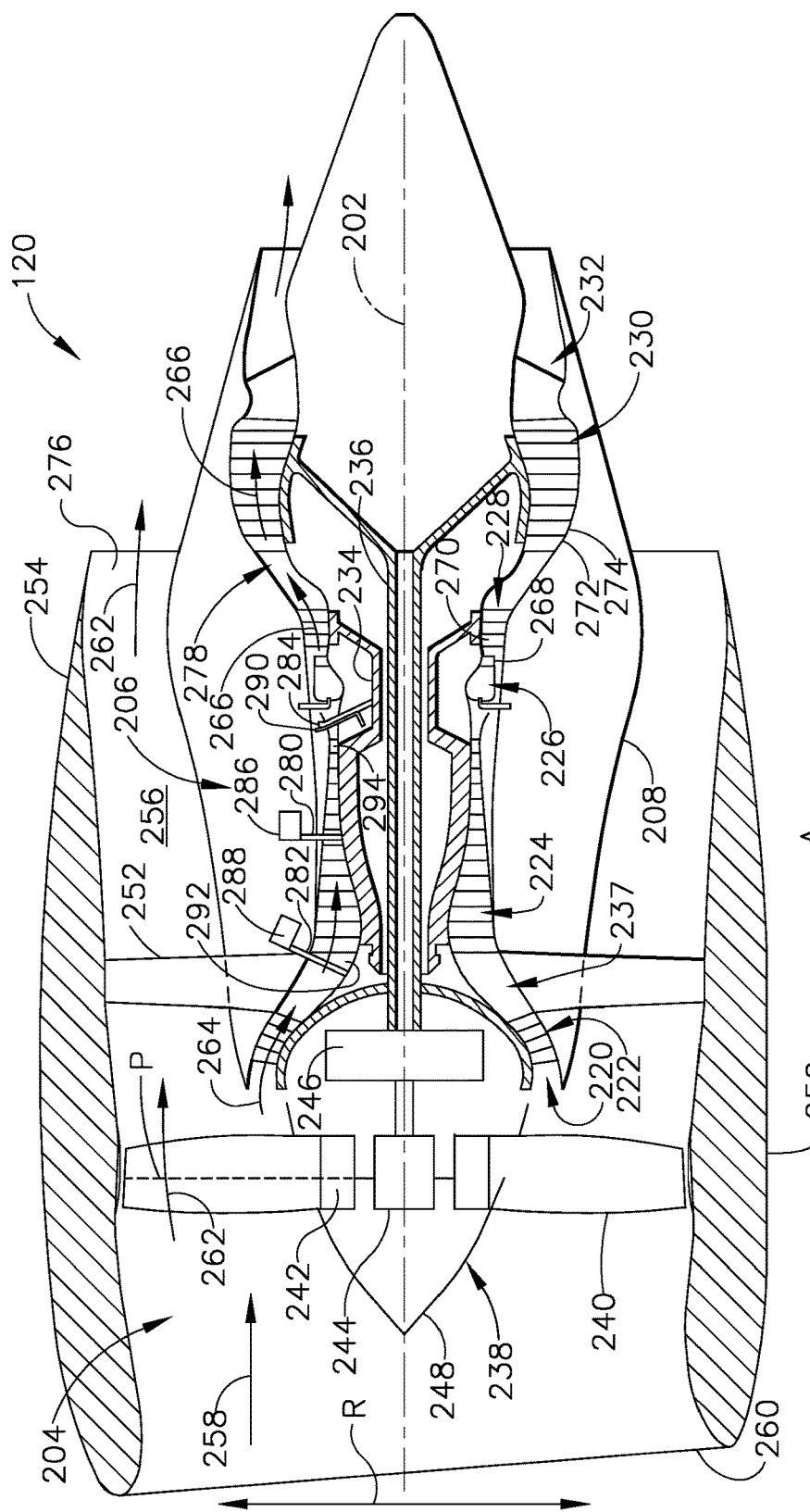
FIG. 2 is a schematic cross-sectional view of the gas turbine engine shown in FIG. 1.

FIG. 2 is a schematic cross-sectional view of gas turbine engine 120 in accordance with an exemplary embodiment of the present disclosure. In the example embodiment, gas turbine engine 120 is embodied in a high-bypass turbofan jet engine. As shown in FIG. 2, turbofan engine 120 defines an axial direction A (extending parallel to a longitudinal axis 202 provided for reference) and a radial direction R. In general, turbofan 120 includes a fan assembly 204 and a core turbine engine 206 disposed downstream from fan assembly 204.

In the example embodiment, core turbine engine 206 includes an approximately tubular outer casing 208 that defines an annular inlet 220. Outer casing 208 encases, in serial flow relationship, a compressor section including a booster or low pressure (LP) compressor 222 and a high pressure (HP) compressor 224; a combustor module 226; a turbine section including a high pressure (HP) turbine 228 and a low pressure (LP) turbine 230; and a jet exhaust nozzle section 232. A high pressure (HP) shaft or spool 234 drivingly connects HP turbine 228 to HP compressor 224. A low pressure (LP) shaft or spool 236 drivingly connects LP turbine 230 to LP compressor 222. The compressor section, combustor module 226, turbine section, and nozzle section 232 together define a core air flowpath 237.

In the example embodiment, fan assembly 204 includes a variable pitch fan 238 having a plurality of fan blades 240 coupled to a disk 242 in a spaced apart relationship. Fan blades 240 extend radially outwardly from disk 242. Each fan blade 240 is rotatable relative to disk 242 about a pitch axis P by virtue of fan blades 240 being operatively coupled to a suitable pitch change mechanism (PCM) 244 configured to vary the pitch of fan blades 240. In other embodiments, pitch change mechanism (PCM) 244 is configured to collectively vary the pitch of fan blades 240 in unison. Fan blades 240, disk 242, and pitch change mechanism 244 are together rotatable about longitudinal axis 202 by LP shaft 236 across a power gear box 246. Power gear box 246 includes a plurality of gears for adjusting the rotational speed of fan 238 relative to LP shaft 236 to a more efficient rotational fan speed.

Disk 242 is covered by rotatable front hub 248 aerodynamically contoured to promote an airflow through the plurality of fan blades 240. Additionally, fan assembly 204 includes an annular fan casing or outer nacelle 250 that circumferentially surrounds fan 238 and/or at least a portion of core turbine engine 206. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a bypass airflow passage 256 therebetween.

During operation of turbofan engine 120, a volume of air 258 enters turbofan 120 through an associated inlet 260 of nacelle 250 and/or fan assembly 204. As volume of air 258 passes across fan blades 240, a first portion 262 of volume of air 258 is directed or routed into bypass airflow passage 256 and a second portion 264 of volume of air 258 is directed or routed into core air flowpath 237, or more specifically into LP compressor 222. A ratio between first portion 262 and second portion 264 is commonly referred to as a bypass ratio. The pressure of second portion 264 is then increased as it is routed through high pressure (HP) compressor 224 and into combustor module 226, where it is mixed with fuel and burned to provide combustion gases 266.

Combustion gases 266 are routed through HP turbine 228 where a portion of thermal and/or kinetic energy from combustion gases 266 is extracted via sequential stages of HP turbine stator vanes 268 that are coupled to outer casing 208 and HP turbine rotor blades 270 that are coupled to HP shaft or spool 234, thus causing HP shaft or spool 234 to rotate, which then drives a rotation of HP compressor 224. Combustion gases 266 are then routed through LP turbine 230 where a second portion of thermal and kinetic energy is extracted from combustion gases 266 via sequential stages of LP turbine stator vanes 272 that are coupled to outer casing 208 and LP turbine rotor blades 274 that are coupled to LP shaft or spool 236, which drives a rotation of LP shaft or spool 236 and LP compressor 222 and/or rotation of fan 238.

Combustion gases 266 are subsequently routed through jet exhaust nozzle section 232 of core turbine engine 206 to provide propulsive thrust. Simultaneously, the pressure of first portion 262 is substantially increased as first portion 262 is routed through bypass airflow passage 256 before it is exhausted from a fan nozzle exhaust section 276 of turbofan 120, also providing propulsive thrust. HP turbine 228, LP turbine 230, and jet exhaust nozzle section 232 at least partially define a hot gas path 278 for routing combustion gases 266 through core turbine engine 206.

During a shutdown mode of operation, heat generated during operation of turbofan engine 120 causes a temperature gradient in a vertically oriented direction principally within core turbine engine 206. This temperature gradient may cause a bow in at least one of HP compressor 224, HP shaft or spool 234, and HP turbine 228 if not mitigated by introducing a flow of cooling fluid, such as, but not limited to, conditioned or non-conditioned air, proximate rotor HP shaft or spool 234. The flow of cooling fluid directly to the area of the rotor shaft reduces the temperature gradient at its point of application directly and displaces heated air in areas of core turbine engine 206 that the flow of cooling fluid is channeled to. In the example embodiment, the flow of cooling fluid is directed to the area proximate the rotor where a large amount of cooling efficiency can be achieved. For example, one or more conduits can be inserted into HP compressor 224 between an inlet stage 292 and an outlet stage 294, upstream of HP compressor 224, or downstream of HP compressor 224 using a respective conduit 280, 282, and 284. A respective fitting 286, 288, 290 external to HP compressor 224 is used to couple to a source of a flow of cooling fluid (not shown in FIG. 2). The source of cooling fluid is a temporary supply used when turbofan engine 120 is shutdown and HP shaft or spool 234 is stationary or coasting to a stop. In some embodiments, the source of cooling fluid is a temporary supply used when turbofan engine 120 and HP shaft or spool 234 is still rotating, for example, while coasting to a stationary condition or when being slowly rotated using an engine starter motor, an air motor, or other turning gear configuration.

Turbofan engine 120 is depicted in FIG. 1 by way of example only, and that in other exemplary embodiments, turbofan engine 120 may have any other suitable configuration including for example, a turboprop engine, military purpose engine, and rotary aircraft power plants.

Figure 3:
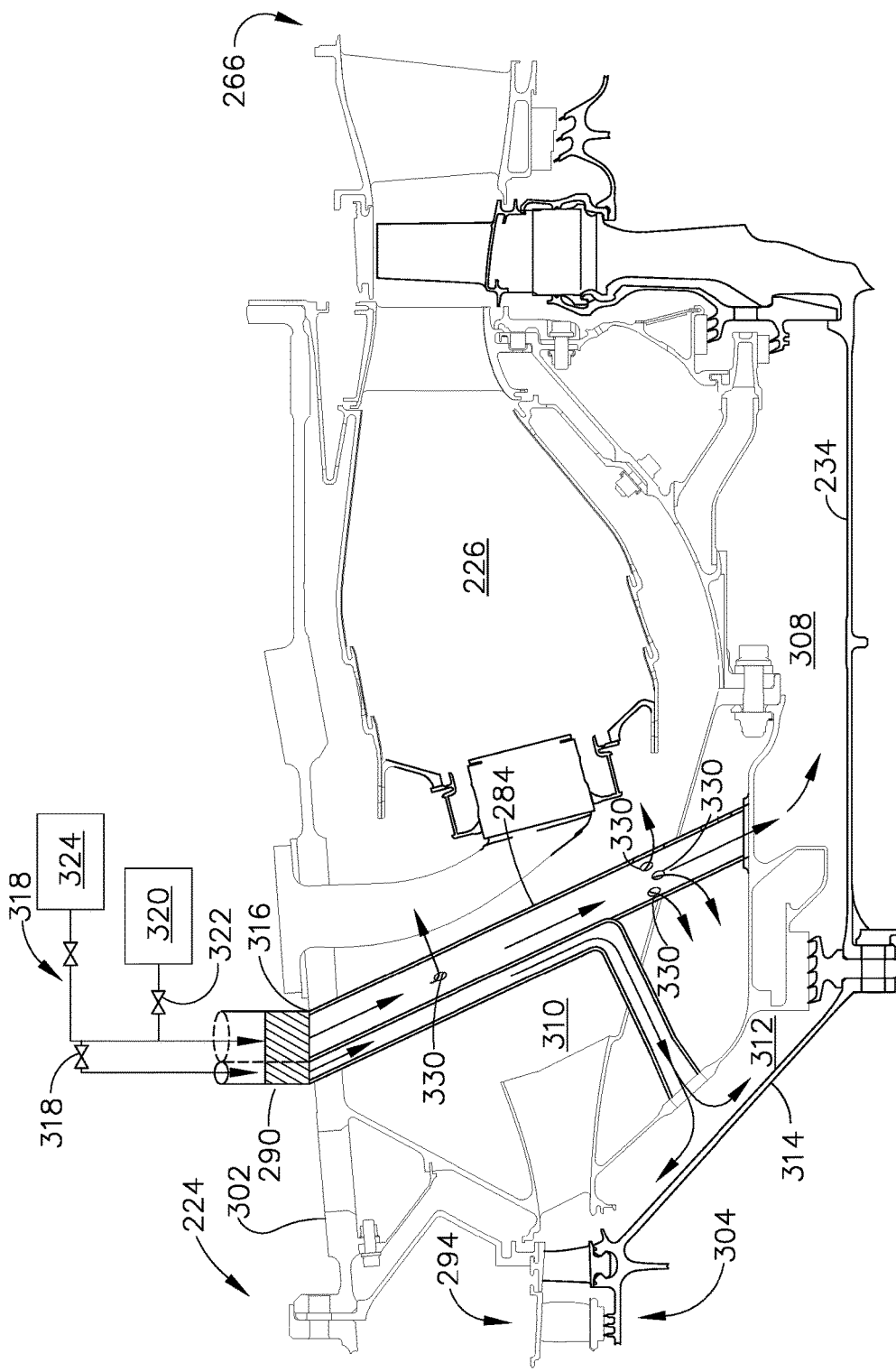
FIG. 3 is a side elevation view of the combustor module and a portion of the HP compressor and the HP compressor, shown in FIG. 2 in accordance with an exemplary embodiment of the present disclosure.

FIG. 3 is a side elevation view of combustor module 226 and a portion of HP compressor 224 in accordance with an exemplary embodiment of the present disclosure. In the exemplary embodiment, a casing 302 at least partially surrounds at least one stage 304 of HP compressor 224, an HP compressor discharge cavity 306, and combustor module 226. In the example embodiment, first conduit 284 extends radially inward from casing 302 to a cavity 308 proximate rotor 234 as shown or may be routed to supply cooling fluid to other areas of engine 120 instead of or in addition to cavity 308. A second conduit 310 extends radially inward from casing 302 to a compressor discharge pressure (CDP) cavity 312, of which a compressor aft shaft 314 forms a wall. First conduit 284 and second conduit 310 may be formed of two individual pipes, routed independently with respect to each other or may be formed a single pipe for at least a portion of their respective lengths. If formed as a single pipe, conduits 284 and 310 are configured to branch apart to channel respective flows to cavity 308 to cool forward HP turbine forward shaft 234 and/or to CDP cavity 312 to cool HP compressor aft shaft 314.

An aperture 316 extends through casing 302 into HP compressor discharge cavity 306. Conduit 284 and/or conduit 310 are coupled to casing 302 in flow communication with aperture 316. In an embodiment where conduits 284 and 310 are embodied in separate pipes, aperture 316 may comprise two separate apertures, each of the separate apertures accommodating one of conduits 284 and 310.

Conduits 284 and 310 may be supplied by separate cooling fluid supplies or may be coupled together through a header and valve assembly 318. In an embodiment, cooling fluid may be channeled from an HP Compressor bleed supply 320 through conduit 284 during operation. The cooling fluid flow from HP Compressor bleed supply 320 may then be secured during shutdown by closing a valve 322. During shutdown, conduit 284 may be supplied with a temporary supply 324 of cooling fluid through a valve 326 from for example, another operating engine on the same aircraft, a ground supply, a service truck, and the like. Also during shutdown, conduit 310 may be supplied from temporary supply 324 through a valve 328 to channel cooling fluid to CDP cavity 312 and directly onto or proximate compressor aft shaft 314. In various embodiments, HP turbine 228 may be operated without HP compressor 224 present. In such an embodiment, conduit 284 may be used to impinge cooling fluid onto forward turbine shaft 234.

In the exemplary embodiment, conduits 284 and 310 are positioned axially aft of outlet stage 294 proximate CDP cavity 312. In other embodiments, conduit 284 is positioned axially between inlet stage 292 and outlet stage 294.

Providing cooling fluid directly to compressor aft shaft 314 and its immediate vicinity during and after a shutdown of engine 120 provides cooling that mitigates a temperature differential between a vertically upper side of HP shaft 234 and a vertically lower side of HP shaft 234. Reducing the temperature differential through a flow of cooling fluid reduces, if not eliminates a bowing of HP rotor 234 allowing a faster subsequent startup. When positioned proximate an area of LP rotor 236, a flow of cooling fluid provides a similar benefit for LP shaft 236.

During operation, a significant differential pressure between cavity 308 and/or CDP cavity 312 and ambient air outside of casing 302. To prevent reverse air flow through conduits 284 and 310, valves 322, 326, and 328 are controlled to be open only when a pressure from one of the cooling fluid supplies is sufficient to provide forward cooling fluid flow through conduits 284 and 310. In another embodiment, check valves may be installed in conduits 284 and 310 to prevent unwanted reverse flow through conduits 284 and 310.

A method of implementing a rotor cooling system in accordance with embodiments of the present disclosure wherein a rotatable member 234, 236 is enclosed within a casing 208 and includes a rotor 234, 236 aligned along an axis of rotation 202 may include forming an aperture 316 through casing 208, coupling a conduit 284, 310 to a radially inner surface of casing 208 and aligned with aperture 316 and extending proximate to rotor 234, 236, and coupling a fitting 290 to an outer surface of casing 208 aligned with the aperture and conduit 284, 310. A source 324 of a flow of cooling fluid may be coupled to fitting 290 and the flow of cooling fluid from source 324 may be channeled to a cavity or area 308, 312 proximate rotor 234, 236 through conduit 284, 310. In some embodiments, the flow of cooling fluid is channeled to the cavity or area 308, 312 proximate rotor 234, 236 when rotor 234, 236 is stationary or coasting down from an operating speed. Additionally, the flow of cooling fluid may be supplied when rotor 234, 236 is being turned by a device other than by exhaust gases produced in combustor module 226. Such a device may be embodied in a turning motor, starter motor, a temporary air motor, and the like. Source of cooling fluid 324 may be embodied in a temporary source of a flow of cooling fluid 324 to fitting 290. Conduit 284, 310 may include a plurality of cooling holes 330 spaced along a length of the respective conduit 284, 310 and/or spaced circumferentially around conduit 284, 310.

The above-described bleed systems provide an efficient method for cooling of gas turbine engine components, such as, but not limited to, gas turbine engine compressors, and more specifically to high pressure rotors of gas turbine engines. Specifically, the above-described gas turbine engine rotor cooling system includes a fitting couplable to a source of cooling fluid, a conduit configured to channel the flow of cooling fluid proximate a predetermined location of high residual heat after shutdown of the gas turbine engine.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gas compressor comprising:
    a rotor;
    a plurality of stages of compression extending along said rotor from an inlet stage configured to receive a flow of relatively low pressure gas to an outlet stage configured to discharge a flow of relatively high pressure gas;
    a casing at least partially surrounding said plurality of stages; and
    a conduit extending radially inwardly from said casing to an area proximate said rotor, wherein said conduit is configured to channel a flow of cooling fluid from said casing to the area proximate said rotor after shutdown of the gas compressor.

2. The gas compressor of claim 1, wherein said casing comprises an aperture extending therethrough, said conduit coupled to said casing surrounding said aperture.

3. The gas compressor of claim 1, wherein said conduit is positioned axially aft of said outlet stage.

4. The gas compressor of claim 1, wherein said conduit is positioned axially forward of said inlet stage.

5. The gas compressor of claim 1, wherein said conduit is positioned axially between said inlet stage and said outlet stage.

6. The gas compressor of claim 1, wherein said casing comprises a fitting external to said casing and aligned with said aperture.

7. A gas turbine engine comprising:
    a multistage compressor comprising a rotor and a plurality of stages of compression extending along the rotor from an inlet stage configured to receive a flow of relatively low pressure gas to an outlet stage configured to discharge a flow of relatively high pressure gas
    a turbine rotor coupled to said multistage compressor using a high pressure shaft;
    a casing at least partially surrounding said multistage compressor and said turbine; and
    a conduit extending radially inwardly from said casing to an area proximate at least one of said compressor rotor and said turbine rotor wherein said conduit is configured to channel a flow of cooling fluid from said casing to the area proximate at least one of said compressor rotor and said turbine rotor after shutdown of the gas turbine engine.

8. The gas turbine engine of claim 7, wherein said casing comprises an aperture extending therethrough, said conduit coupled to said casing surrounding said aperture.

9. The gas turbine engine of claim 7, wherein said conduit is positioned axially aft of said outlet stage.

10. The gas turbine engine of claim 7, wherein said conduit is positioned axially forward of said inlet stage.

11. The gas turbine engine of claim 7, wherein said conduit is positioned axially between said inlet stage and said outlet stage.

12. The gas turbine engine of claim 7, wherein said casing comprises a fitting external to said casing and aligned with said aperture.

13. A method of cooling a rotatable member enclosed within a casing, the rotatable member including a rotor aligned along an axis of rotation, said method comprising:
    forming an aperture through the casing;
    coupling a conduit to a radially inner surface of the casing aligned with the aperture and extending proximate to the rotor;
    coupling a fitting to an outer surface of the casing aligned with the aperture and the conduit;
    coupling a source of a flow of cooling fluid to the fitting; and
    channeling the flow of cooling fluid from the source to proximate the rotor through the conduit, wherein channeling the flow of cooling fluid comprises channeling the flow of cooling fluid when the rotor is stationary.

14. The method of claim 13, wherein coupling a source of a flow of cooling fluid to the fitting comprises coupling a temporary source of a flow of cooling fluid to the fitting.

15. A method of forming a rotatable member enclosed within a casing of a gas turbine engine, the rotatable member including a rotor aligned along an axis of rotation, wherein an aperture is formed through the casing, said method comprising:
    coupling a source of a flow of cooling fluid to the fitting; and
    channeling the flow of cooling fluid from the source to proximate the rotor through the conduit after shutdown of the gas turbine engine.

16. The method of claim 15, further comprising coupling a conduit including a plurality of apertures spaced along a length of the conduit.

17. The method of claim 15, further comprising coupling a conduit including a plurality of apertures spaced circumferentially around the conduit.

* * * * *